Feb. 13, 1934.   P. C. HAAS   1,946,790
COMPOSITE BEARING
Filed Jan. 18, 1932
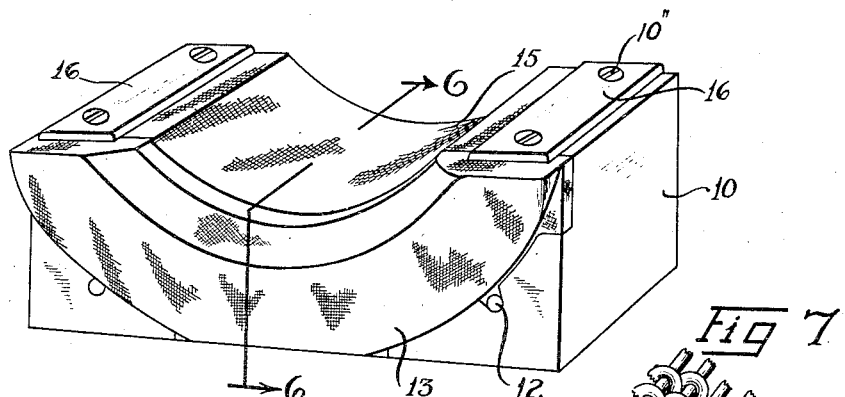
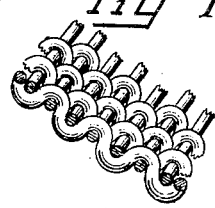
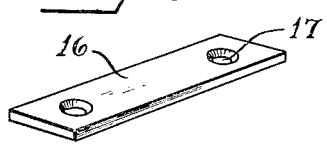
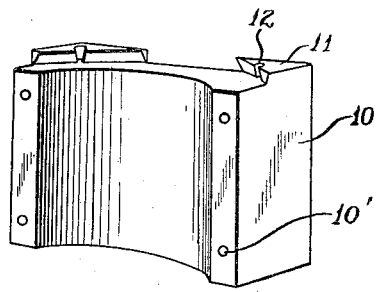
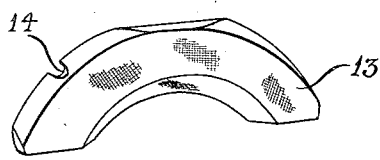
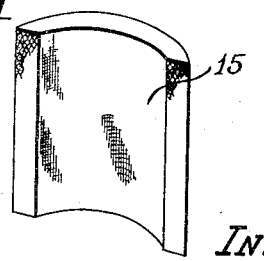
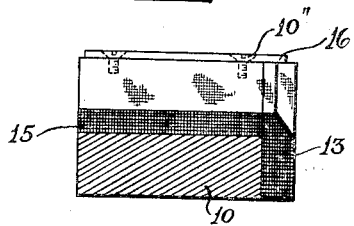
INVENTOR
Paul C. Haas
Jones, Addington, Ames & Seibold
ATTORNEYS Patented Feb. 13, 1934

1,946,790

UNITED STATES PATENT OFFICE 1,946,790

COMPOSITE BEARING

Paul C. Haas, Meridon, Mich.

Application January 18, 1932. Serial No. 587,255

7 Claims. (Cl. 308—238)

The present invention relates to an improved bearing suitable for industrial uses on heavy machinery and particularly as a roll-neck bearing.

One of the objects of the invention is to produce a bearing which requires only water lubrication and which even under heavy loads will present a minimum of frictional resistance to the motion of the part or parts supported thereby.

A further object of the invention is to provide a bearing consisting of a fabric or fibrous base that has been cemented together and hardened by means of an artificial resin having a relatively high melting point but which at no time is infusible, the purpose being to allow a small portion of this synthetic resin binder to be removed from the bearing surface by the friction of the supporting part, whereby the individual of the fibers are exposed and, under the influence of the water lubrication, imbibe water and thereby become slippery and unctuous, thereby greatly assisting in reducing the friction.

A further object of the invention is to provide a bearing consisting of a main metallic or wooden supporting block upon which there are mounted one or more pieces of impregnating fibrous material in such relationship that it will operate both as a thrust and a supporting bearing, the parts being individual and individually replaceable.

Another object of the invention is to provide a bearing, the bearing-surface of which consists of cellulosic fibers held together by means of a cumarone resin having a fairly high melting point but of a type which is not capable of final hardening or induration and so constituted that it will release a small portion of the fibers so that they may freely imbibe water and thereby form an unctuous slippery surface for the bearing.

Further objects of the invention will appear from the detailed description hereinbelow taken in connection with the drawing submitted with this application, in which drawing—

Figure 1 is a perspective view of the finished assembled bearing;

Fig. 2 is a perspective view of the supporting block;

Fig. 3 is a perspective view of the end or thrust bearing member of the composite bearing;

Fig. 4 is a perspective view of the supporting or radial portion of the bearing;

Fig. 5 is a detail of a mounting plate or support;

Fig. 6 is a partial cross-section along the line 6—6 of Fig. 1; and

Fig. 7 is an enlarged view showing one form of the weave of the material that is impregnated.

Large bearings, particularly for heavy machinery parts such, for example, as roll-neck bearings in rolling-mills, present a particularly difficult problem, especially regarding lubrication. In such cases, it is necessary to apply cooling-water to the bearings because of the heat ordinarily transmitted from the rolls themselves to the bearings, and such cooling-water usually interrupts the regular lubrication of metallic bearings. For this reason, efforts have been made in the past to provide non-metallic bearings such, for example, as wooden bearings which are dried and impregnated with oil or with oil suspensions of graphite and the like. Such bearings, however, are very short-lived and rapidly become deformed so that their replacement becomes necessary. This, of course, interrupts the operation of the mill and therefore is a great inconvenience.

A number of efforts have been made in the past to provide non-metallic bearings made of various synthetic resins, particularly of the phenol formaldehyde type, these usually being cut from laminated canvas stock. Such bearings, however, are extremely hard and brittle, and are very prone to break under unusual shock or stress to which the rolls may be subjected during use. Furthermore, being laminated, there is a decided tendency for delamination during use, which of course renders the bearings of no further utility and necessitates replacement.

Blocks of wood impregnated with resins have also been used but suffer from the defect that they are readily torn and their surfaces become pitted. They are also somewhat resilient and therefore will sag, thus interfering with the accurate setting of the rolls.

In accordance with the present invention, however, all these inconveniences and difficulties have been overcome by providing a composite bearing which consists of a main bearing supporting block or member 10, which may be made of metal or a very hard wood such as lignum-vitæ, but preferentially is a metallic casting. This supporting block 10, as best shown in Fig. 2, is provided at one side with offsets 11 provided with grooves 12. These offsets are either stepped-in or inclined in such a way that they will serve to support and prevent from lateral displacement an end or thrust member 13 which is shown in Fig. 1 in combination with the other parts of the bearing, and by itself in Fig. 3. This thrust member 13 is also provided with cut-away portions 14 corresponding with the openings 12 on the projections 11 of the block 10.

The said block 10 is also provided with a plurality of threaded openings 10' which cooperate with suitable screws 10'', as will be shown later.

There is provided a supporting or radial member 15 which is preferably about 120° of the circumference of the roll that is to be supported thereby and which is so shaped that it will accurately fit into the arcuate portion of the block 10. It is supported in position by metallic retaining plates 16, one of which is illustrated by itself in Fig. 5, having recessed openings 17 for the passage of the screws 10'' which engage the threaded openings 10' in the main block 10. These said plates 16 are of sufficient length also to cover a part of the ends of the thrust portion 13. The assembly is shown complete in Fig. 1 and in cross-section in Fig. 6.

It is not deemed necessary to show the shaft of the roll nor the means for supplying water as the lubricant, as the invention resides in the construction of the bearing itself and more particularly in the composition of which it is made.

As already hereinabove stated, bearings consisting of canvas or duck impregnated with synthetic resins capable of induration—such, for example, as the phenolic condensation products—have already been described and employed for certain purposes such as non-lubricated bushings for automobile spring hangers or the like. For the present purpose, however, such hardened products are not suitable, as they have too high a coefficient of friction, even when copiously lubricated with water, and furthermore are not self-healing as are the bearings made in accordance with the present invention.

The portions 13 and 15 of the bearing, as made in accordance with the present invention, preferably consist of a webbing which in its best exemplification consists of cotton which has been impregnated with cumarone resin; for instance, a webbing similar to that illustrated in Fig. 7 will be suitable. The bearing is to be distinguished from a laminated bearing made of a number of layers of fabric which have been cemented together by means of a resin or other binder, in that the bearing is a unitary structure that consists of two or more relatively thickly woven portions which, however, are much thicker than the ordinary canvas laminations in a laminated plate or tube. In its finished condition, when ready for assembly with the metallic supporting block 10, the parts 13 and 15 will contain approximately 73% of cellulose such as cotton and about 27% of cumarone resin.

The method of making the bearings is substantially as follows:

A suitable webbing, of the kind in which the fibers run in all three cubical directions, is impregnated with a solution of a cumarone resin having a melting point of between 135° and 150° C., these resins being usually designated in the United States as "medium hard' and "varnish grade". It is not believed necessary to describe these cumarone resins, as they are a very well known article of commerce, and a complete description of their properties may be found in the work entitled "Artificial Resins", by Scheiber and Sändig, published by Sir Isaac Pitman & Sons, Limited, of London, in 1931, a description of these resins appearing between pages 228 and 271, and more particularly on page 243. These resins are soluble in benzene and its homologues, solvent naphtha, turpentine oil, acetone, ether, ethyl acetate, amyl acetate, carbon tetrachloride, chloroform, trichloroethylene, and carbon disulphide, and are somewhat soluble in petroleum spirits. They are practically insoluble in alcohol.

The impregnation of the woven webbing may be carried out either by melting the resin and immersing the webbing therein or, preferentially, by employing a solution of the cumarone resin in one of the above enumerated solvents. The original impregnation should be about 45% of cumarone, so that there may be an excess which will afterwards be squeezed out during the molding operation. If a solvent is employed for carrying the cumarone resin into and around the cellulose fibers of the webbing, this solvent should first be removed by allowing it to evaporate or by any other suitable method of drying, whereby the solvent may, if desired, be recovered by any suitable means.

The webbing thus prepared and substantially free from solvent is then molded between two curved blocks or in a suitably constructed die, all in accordance with well known molding technique, at a temperature of about 150° to 160° C. (about 300° F.), under a pressure of about 1000 pounds per square inch, the pressure being exerted only long enough to give the bearing the desired shape, whereupon the mold or the curved blocks are immediately cooled so as to set the resin and cause the molded parts to retain the shape given to them by this operation. It will be noticed that there is no attempt made to compress the material to its final extremely dense state but only sufficiently to bring the impregnation down to about 27%. The excess cumarone resin is thereby expelled in the fluid state and can, of course, be employed for subsequent operations, being either melted or dissolved in a suitable solvent.

The structure thus resulting may then, if necessary, be trimmed to shape, although when made in properly shaped molds it will be sufficiently accurate for immediate assembly in the manner shown in Figs. 1 and 6.

When placed into use, the first effect is the removal of the skin of resin on the molded part by reason of its frictional engagement with the periphery of the shaft or neck of the roller. This will immediately expose a very large number of cellulosic fibers which, by reason of the fact that water is continually being pumped around and through the bearing, will absorb this water and swell, and will thereby form a very minute but effective cushion having a low coefficient of friction, so that the rolls may be rotated with a minimum consumption of applied power.

The particular advantage of the present bearing lies in the fact that if for any reason the supply of water should become too low or the temperature too high, the only effect will be a removal of a little more of the resin and a consequent exposure of more of the fibers. This is a result which has not hitherto been attained in this art and therefore sharply differentiates the present invention from any previous molded bearings made from phenolic resins or the like, as these—being infusible and insoluble—will not permit of the exposure of the cellulosic portions of the webbing and therefore are not endowed with the valuable properties that inhere in the bearings as herein described.

It is within the contemplation of the present invention to furnish impregnated webbing to those who desire to manufacture bearings therefrom in their own plants, as the molding equipment required is extremely simple and the molding may be accomplished either in a screw-press or hydraulic press or in a comparatively simple jig which may readily be assembled by a skilled workman in a rolling-mill or other plant where these bearings are to be employed.

The bearing may be made from a piece of impregnated webbing by laying the same upon the block 10 which has been suitably heated, whereupon a piece of shafting corresponding in size to the neck of the roll that is to be supported by the bearing, and which has likewise been heated, is placed thereon, and the assembly is then placed into pressure applying means such as a hydraulic press until the resin softens and the webbing assumes the shape of the radial supporting member 15, whereupon the assembled material may be cooled by the simple expedient of dashing water thereon or playing water upon it with a hose. It is thus seen that it is not necessary to employ special molding equipment and that therefore the bearings may be made in outlying sections of the world where molding plants are not available.

Their extreme simplicity is a particular advantage inherent in bearings made of webbing impregnated with cumarone. It therefore could not have been predicted or foreseen that particular advantages would reside in the choice of the binder, whereas, in fact, as hereinabove set forth, these advantages are very marked and produce a highly desirable article.

It is pointed out, however, that the precise construction shown in the figures of the drawing need not be slavishly followed, as, of course, the bearings will have to be modified in accordance with the use to which they are to be put. The essential point of the invention lies in the cooperation between the cumarone resin binder and the woven webbing so as to produce the effect sought after, namely, a bearing which will be extremely slippery when lubricated with water, which is self-healing, and which accommodates itself accurately to the shaft supported thereby.

Other resins having the qualities of cumarone resins, in so far as their melting point is concerned, may be substituted for the cumarone resin, but resins which tend to polymerize and become infusible and insoluble are not suitable for this purpose.

As a modification, the impregnating fluid, consisting of either dissolved or molten cumarone resin, may also have incorporated therewith a small amount of oil-dispersible graphite, which will further increase the lubricating value of the bearing, but for most purposes such addition of graphite is unnecessary.

The following is claimed for the above invention:

1. A bearing material consisting of a woven webbing impregnated with a fusible resin of a type that is incapable of being converted into an infusible state.

2. A bearing material consisting of a woven webbing impregnated with a fusible synthetic resin of a type that is incapable of being converted into an infusible state.

3. A bearing material consisting of a woven webbing impregnated with cumarone resin.

4. A bearing material consisting of a woven webbing rendered rigid by means of a fusible resin, the latter being present in an amount less than the weight of the webbing.

5. A bearing material consisting of a woven webbing impregnated with cumarone resin in an amount not substantially in excess of 30% of the weight of the entire bearing.

6. A bearing material for use with water-lubrication comprising a mass of cellulosic webbing imbedded in a minor portion of a fusible resin whereby, under the influence of friction and the action of applied water, a portion of the webbing will be exposed and become wet, thereby forming an unctuous distended cellulosic bearing-surface.

7. A bearing material comprising a body of cellulosic webbing impregnated with a fusible resin incapable of being converted into an infusible state and a bearing-surface of cellulosic fibers the ends whereof being imbedded in the resin.

PAUL C. HAAS.